Patented Apr. 17, 1951

2,549,508

UNITED STATES PATENT OFFICE 2,549,508

PREPARATION OF UNSATURATED KETONES AND ALDEHYDES

Henry O. Mottern, Bloomfield, N. J., assignor to Standard Oil Development Company, a corporation of Delaware No Drawing. Application October 15, 1948, Serial No. 54,821

10 Claims. (Cl. 260—586)

This invention relates to the preparation of unsaturated aldehydes and ketones of increased molecular weight by condensation of aldehydes and ketones of the same or different type in the presence of a novel catalyst. It is an object of this invention to prepare unsaturated carbonyl compounds of increased molecular weight by a one-step condensation of two or more molecules of the same, different, or mixed carbonyl compounds.

According to the terms of this invention, the following reactions to produce carbonyl compounds of increased molecular weight are contemplated.

1. The reaction between two or more molecules of the same or different aliphatic ketones, saturated or unsaturated.
2. The reaction between two or more molecules of the same or different aldehydes, saturated or unsaturated.
3. The reaction between one or more molecules of a ketone saturated or unsaturated with one or more molecules of an aliphatic aldehyde saturated or unsaturated.

The product from the above reactions is an unsaturated aldehyde or unsaturated ketone of increased molecular weight. The reactions are carried out in the vapor phase in the presence of hydrogen and in the presence of a specially prescribed catalyst as will be described below.

According to the terms of this invention, unsaturated aldehydes and ketones are produced by carrying out the above mentioned reactions in the presence of a catalyst consisting of a major portion of an oxide of magnesium, zinc or beryllium, and a minor portion of an oxide of zirconium, cerium, and thorium. The latter oxides are present in amounts ranging from 1 to 15 weight per cent, preferably 6 to 12 weight per cent, based on the total weight of the combined oxides. It has been found that from 1 to 15% by weight of at least one of the oxides of zirconium, cerium, or thorium, greatly improves the condensation action of the magnesium oxide, zinc oxide, or beryllium oxide in its catalytic activity.

The prior art discloses processes for the condensation of low molecular weight ketones and aldehydes to higher molecular weight ketones and aldehydes in liquid phase condensation, by using hydroxides, alkali or alkaline earth hydroxides. Similar vapor phase condensation reactions employ lime, metal phosphates, etc. U. S. Patent applications, Serial Numbers 634,883, 634,884, and 634,885, filed December 13, 1945 in the name of the writer, have disclosed the use of a new catalyst consisting of zinc oxide and bismuth oxide for the above condensation. The catalyst disclosed in this invention is an improvement over the zinc oxide-bismuth oxide catalyst in that a more pure product in a higher yield and at a higher rate is obtained.

PREPARATION OF CATALYST

The preparation of the catalyst by which this condensation is effected may be exemplified by the preparation of a zinc oxide-zirconium oxide catalyst.

There are various types of zirconia which may be employed in the preparation of the zirconia-containing catalysts of this invention. Typical analyses of some of the grades of zirconia suitable are as follows:

|  | Tamo-pax [1] | C. P. Grade | Electrically Fused | Spectroscopic Reference Sample |
|---|---|---|---|---|
| Per Cent $ZrO_2$ | 87.97 | 99.37 | 97.10 | 99.943 |
| Per Cent $SiO_2$ | 8.49 | 0.30 | 1.88 | 0.020 |
| Per Cent $Al_2O_3$ | 0.38 | 0.08 | 0.52 | 0.005 |
| Per Cent MgO | 0.30 | 0.05 | 0.05 | 0.005 |
| Per Cent $Na_2O$ (as Silicate) | 1.50 | 0.02 | 0.02 | 0.002 |
| Per Cent $TiO_2$ | 0.30 | 0.15 | 0.30 | 0.005 |
| Per Cent $Fe_2O_3$ | 0.08 | 0.03 | 0.11 | 0.020 |

[1] A grade of zirconia manufactured by the Titanium Alloy Mfg. Co., Niagara Falls, N. Y.

It has been established, however, that the catalytic effect of the zirconia added to the oxides of zinc, magnesium or beryllium, is due to the zirconium oxide itself, and not to the impurities contained therein. This was demonstrated by an experiment employing pure zirconium oxide as the additive to ZnO. In the preparation of the catalyst it is preferred to mix the two oxides in the proper proportions in purified form, then to work enough water into the mixture to make a heavy slurry of about the consistency of heavy cream. This will ordinarily require a volume of water approximately equal to the volume of purified oxides employed. The catalyst slurry is then coated on a carrier. The coating may be accomplished by placing the catalyst support or carrier in a tumbling device, pouring the catalyst slurry over the carrier, and then tumbling until a uniform thick mix is secured. The mix is then placed in an oven at a temperature of about 80° C. and dried. The drying required approximately 24 to 48 hours. Metal turnings may be employed as the catalyst carrier or support, although pumice in granular or pill form may be used as well as other types of carriers which are well-known in the catalyst art. Pumice and metal turnings are preferred carriers, and of the metal turnings, steel or brass turnings are preferred. It has also been found that a rock-like form of fused zirconia (not powdered or treated) forms a good support for the active catalytic oxides. The zirconia in this form is not itself catalytically active for the condensation. In the preparation of the catalyst, the zirconium oxide is present in amounts between 1 to 15 weight per cent based on the total oxides. The improvement obtained by using less than 1% of zirconium oxide, cerium oxide, or thorium oxide, or mixtures thereof is perceptible, but not sufficient to be of any consequence, while the improvement obtained by using more than 15% of these oxides is not sufficient over that obtained when using about 6 to 12 per cent, to warrant the additional expenditure.

It has also been found that catalysts of the type described can be further stabilized by the addition thereto of approximately 6 to 10 per cent based on the weight of the zirconium, cerium, or thorium oxides, of a stabilizer selected from the group consisting of silica, alumina, and ferric oxide. The amount of stabilizer present would be approximately 0.1 weight per cent to 1.5 weight per cent based on the total oxides.

In the practice of this invention it is necessary that the vapors of the aldehyde, ketone, or ketone-aldehyde mixture be mixed with hydrogen before their passage over the catalyst. Hydrogen has the effect of activating the catalyst and when hydrogen is not present, the amount of condensation is smaller. The aldehyde or ketone fed and hydrogen are preferably kept in mol to mol proportion, although it may be desirable to increase the proportion of hydrogen. It has been found that the proportion of hydrogen can be extended to 3 mols per mol of reactant or reactants without a reduction in the efficiency of the condensation.

When the ketone or aldehyde employed in the condensation reaction contains five or more carbon atoms per molecule, the product yields a mixture of saturated and unsaturated ketones of increased molecular weight indicating that the unsaturated ketones containing ten or more carbon atoms per mol are more prone to undergo hydrogenation in the presence of hydrogen than ketones of lower molecular weight.

The condensation of the ketones and aldehydes tends to form unsaturated ketones or unsaturated aldehydes respectively as the major product. The larger proportion of the condensation product is an unsaturated ketone or unsaturated aldehyde containing twice the number of carbon atoms as the initial ketone or aldehyde. A small residue of heavier products of the aldol condensation type is also formed, for example, acetone is condensed to mesityl oxide as the major product, and phorone and isophorone as the minor products. Acetaldehyde is condensed to croton aldehyde as the major product and to unidentified multiple polymeric type units such as conjugate olefins, $C_8$ aldehydes as the minor product. Some resin is always isolated from the condensation products. Mixtures of aldehydes and ketones can also be condensed to form unsaturated aldehydes and ketones, the final type of carbonyl group largely depending upon the activity of the initial aldehyde or ketone. Acetaldehyde condenses with acetone to form a pentene 2-one 3 as the major product of the intermolecular condensation.

The condensation of the aldehydes and ketones is carried out in the vapor phase over these catalysts under controlled conditions of temperature and pressure and velocities of vapor flow. The temperature of the condensation is usually held below that at which the products of condensation are not decomposed. It has been possible to use temperatures above decomposition temperatures by conducting the vapor over the catalyst at high velocities or low partial pressures or both. The condensation is best carried out at low partial pressure of reactants or a low total reaction pressure. The products of condensation have been shown to form at the catalyst surface and are difficult to remove either because of their high boiling points or that they are closely adsorbed. Low partial pressures apparently aid in vaporizing the condensation products from the catalyst surface. Inert gas or gases behaving as inerts toward the reaction are used most advantageously for reducing the partial pressure of reactants and products. Hydrogen has proved to be the most efficient because it also has the effect of improving the activity of the catalyst. Conversions to condensation products are found to be several per cent greater when hydrogen is used. The quantity of hydrogen used, in relation to the initial carbonyl compound feed, was at least ½ mol hydrogen per mol and not more than 3 mols hydrogen per mol of carbonyl compound. This range was found to provide conversions of the desired efficiency and quantities of hydrogen above 3 mols/mol did not improve the conversions to condensed products.

The temperature required for condensation lies in the range of 500° to 1000° F. Variations of temperature within this range depend upon the proportion of hydrogen to feed and upon the liquid feed rate. If the temperature is in the lower part of the range the feed rate can be slow and the hydrogen proportion low. If the temperature is in the upper part of the range (800° to 1000° F.) the feed rates must be fast and the proportion of hydrogen high (3/1 mol). The preferred temperature range for condensation is 600° to 800° F. In this narrow range of temperature the rate of conversion is high enough to be economic and not high enough to cause losses to by-products of the reaction. The by-products noted have been hydrocarbon of twice to four times the carbon atoms of the initial carbonyl compound, some alcohol (either of the same homologous series or higher in carbon atoms) and resinous products which could not be identified as individual compounds. The wide range of temperature is indicated to show how the invention can be carried on to make use of a longer catalyst life.

The condensation may take place at atmospheric or elevated pressure.

The condensation takes place by the aldol mechanism, the products of the aldol being dehydrated to form an unsaturated carbonylic molecule. For example, acetone is condensed to form mesityl oxide as the end product. There has been no reason to assume that the condensation takes place by any other mechanism than the aldoling, following by dehydration. Acetone forms mesityl oxide, MEK forms a methyl heptenone, MPK forms a $C_{10}$ ketone; acetaldehyde forms crotonaldehyde, propionaldehyde forms a methyl amyl aldehyde; mixtures of aldehydes and ketones react to produce unsaturated ketones in at least 1/3 of the theoretical yield and usually in higher yields. Formaldehyde can be condensed with any of the aliphatic or aryl alkyl ketones forming methylene substituted ketones. Acetaldehyde condenses with the aliphatic ketones to form the ethylidene substituted ketones. Acetaldehyde condenses with the aliphatic ketones to form the ethylidene substituted ketones. Other products of the homologous series are evident from those named.

The catalyst may be situated as a fixed bed or as a fluidized solid. The fixed bed catalyst is made up by depositing the powder mix on any suitable carrier. The preferred carriers are metallic machine turnings, the metals being capable of easily forming oxide films, such as iron, aluminum, zinc, etc. The fluidized solid technique should employ powder mixes having the particles ground or prepared to sizes of about 10-100 microns.

A typical operation of this invention can be carried on as follows: Methyl ethyl ketone and hydrogen are fed at a measure rate of 0.5 to 3.0 vol. liquid/vol. catalyst space/hour to an exchanger section of pipe or tubes capable of vaporizing and preheating the MEK to 750° F. The vapors pass from the preheater to the pipe holding the catalyst which is heated to maintain the temperature at 750° F. The vapors pass from the catalyst bed to a condenser and receiver where the hydrogen is disengaged from the liquid for recycling to the preheater and catalyst chamber. The crude material containing the octyl ketone (3-methyl, 3-heptenone-5) is then collected for fractionation to separate the unchanged MEK from the crude condensate for recycling to the catalyst chamber. The crude $C_8$ condensate is then steam distilled or fractionated under vacuum to produce a pure product. Other ketones and aldehydes are handled by the same procedure varying the quantities and conditions for condensation as desired to produce the maximum utilization of materials.

The unsaturated ketones and aldehydes produced by this condensation are chiefly useful as chemical intermediate compounds. Reduction with hydrogen forms the saturated ketones which in the aliphatic series gives valuable solvents for lacquers and resins. Other chemical derivatives are prepared by reaction of the unsaturated ketones or aldehydes with such reagents as hydrogen peroxide, sulfonic, nitric or hydrochloric acid, ammonia, amines and other like agents.

The following examples illustrate the operation of the invention as described:

EXAMPLE I

*Condensation of methyl ethyl ketone*

Methyl ethyl ketone and hydrogen were passed over a catalyst composed of 94 parts ZnO and 6 parts of $ZrO_2$. The ratio of hydrogen to MEK fed was approximately a mol per mol ratio. The reaction chamber contained 120 cc. of catalyst and carrier. The feed rate was adjusted to 180 cc. MEK/hour which was equal to a space velocity of 1.5 v./v. hour. Hydrogen was fed at a rate of 1.6 cu. ft./hour. The temperature of the vapor in the reaction chamber was held at 750-760° F. MEK was fed to extent of 900 cc. over a five hour period.

The vapors were condensed, with a Dry Ice trap type condenser, and measured from the outlet of the reactor. The condensate was analyzed for unchanged MEK and total condensed ketone by fractionation.

| Catalyst | $H_2$ Fed, cu. ft. | Vol. Dist., cc. | Vol. Condensed $C_8$ Ketone by Fractionation | Vol. Per cent MEK Fed. Conv. |
|---|---|---|---|---|
| | | | Cc. | |
| $94ZnO:6ZrO_2$ | 7.935 | 880 | 101 | 13.7 (1) |
| $94ZnO:6ZrO_2$ ($ZrO_2$ had 8% $SiO_2$) | 9.22 | 868 | 114.6 | 15.5 (2) |
| $88ZnO:12ZrO_2$ ($ZrO_2$ as in (2)) | | 886 | 84.2 | 11.4 (3) |

EXAMPLE II

*Condensation of acetone with propionaldehyde*

Acetone and propionaldehyde condensed on passage over $ZnO:ZrO_2$ catalyst with hydrogen to form propylidene acetone and some mesityl oxide. A mol to mol solution of propionaldehyde and acetone was passed at the rate of 120 cc./hr. over 120 cc. of the catalyst at 750° F. A total volume of 2160 cc. of the solution was used. The volume of crude product recovered was 2023 cc. The crude product was distilled over water recovering unchanged acetone and propionaldehyde plus 236 cc. of the condensed products propylidene acetone and mesityl oxide. The products were identified and characterized by boiling point, specific gravity, and reaction with hydroxyl amine. On reduction with hydrogen over Raney nickel catalyst, fractionation showed methyl n-butyl ketone and methyl isobutyl ketone. The catalyst was composed of 94 parts ZnO and 6 parts commercial grade $ZrO_2$.

EXAMPLE III

*Condensation of acetone with mesityl oxide*

Acetone and mesityl oxide were condensed to phorone and isophorone by passage over the catalyst $94ZnO:6ZrO_2$ at 900° F. at a liquid space velocity of 3.0 v./v./hr. The $ZrO_2$ was 97% pure, other compounds present being $SiO_2$, $Al_2O_3$ and $Fe_2O_3$ to the extent of 3% total. The volume of acetone-mesityl oxide solution fed was 900 cc. in the presence of an equimolar quantity of hydrogen. The crude condensate amounted to 875 cc. which on fractionation was separated into unchanged mesityl oxide and acetone, isophorone and phorone. A residue of resinous material was left behind. The reaction was conducted at atmospheric pressure. A fraction of phorone and isophorone of 96.5 cc. was isolated.

EXAMPLE IV

*Condensation of acetone and propionaldehyde*

Acetone was mixed with propionaldehyde in mol to mol proportions and fed to a reacting zone with hydrogen in molar proportion. The catalyst employed was composed of 94 weight per cent ZnO and 6 weight per cent $ZrO_2$ (electrically fused). The acetone-propionaldehyde solution was fed at a rate of 120 cc. per hour for a 5 hour period. Hydrogen was fed at the rate of 1.45 cu. ft. per hour. The reaction temperature was held at 749-752° F. After fractionating off unchanged acetone and propionaldehyde, 212 cc. of material boiling higher than either component was recovered. Fractionation of 155 cc. of the bottoms produced 60 cc. of material boiling 80-102° C.; 78 cc. boiling 102-163° C. (propylidene acetone and mesityl oxide); and 11 cc. of a bottoms residue.

The 78 cc. fraction was hydrogenated by passage with hydrogen over Raney nickel at 130° C. The products of hydrogenation were methyl n-butyl ketone and methyl isobutyl ketone. Fractionation of the hydrogenated material showed more n-propyl alcohol present and a ketone boiling in the range of 84–100° C. The low boiling ketone was not identified except by B. P. which would indicate the formation of some methyl n-propyl ketone. The two hexyl ketones amounted to 55% of the hydrogenated material. After accounting for handling losses 28.5 vol. per cent of the crude condensate was recovered as methyl isobutyl and methyl n-propyl ketone. Based on original volume of feed the yield would be 9.1 vol. per cent.

EXAMPLE V

Condensation of methyl ethyl ketone and formaldehyde

MEK and formaldehyde were condensed to methyl isopropylene ketone by vaporization over 94ZnO:6ZrO$_2$ (elec. fused) catalyst at 750–760° F. in the presence of hydrogen gas. The feed rate was based on the MEK liquid rate and was 1.5 v./v./hr. Formaldehyde was formed by heating the solid paraformaldehyde and introducing the vapor into the vaporized MEK as it entered the catalytic chamber. Hydrogen was fed at the same point. No material balance was made to determine the yield of unsaturated ketone.

Fractionation of the crude product gave a bottoms identified as an alpha methyl vinyl ketone, boiling 97–106° C. The fraction was allowed to stand in a clear test tube for several weeks, after which time a highly viscous polymeric resin was formed. This resinification is characteristic of alpha-unsaturated ketones of low molecular weight.

EXAMPLE VI

Condensation of methyl ethyl ketone

Methyl ethyl ketone and hydrogen in mol equivalent proportions were passed over a catalyst consisting of 94 weight per cent MgO and 6 weight per cent ZrO$_2$ (C. P. grade) at 750° F., at a rate of 1.5 v./v./hr. A crude product was recovered having the following analysis:

|  | Weight per cent |
|---|---|
| MEK | 88.9 |
| SBOH | 3.2 |
| Water | 4.0 |
| Ethyl iso-amyl ketone | 4.8 |

EXAMPLE VII

Condensation of acrolein with acetone

Acrolein and acetone were mixed to a mol/mol solution and passed as vapor over a catalyst composed of 89.52 parts ZnO, 5.72 parts ZrO$_2$ (C. P. grade) and 4.76 parts Fe$_2$O$_3$. The temperature was 750° F. and the liquid feed rate 1.5 v./v./hr. The catalyst charge was 120 cc. The vaporized solution was diluted with hydrogen as the vapors passed over the catalyst with one mol of hydrogen per mol of carbonyl compound.

From 295 cc. fed, 287 cc. were recovered. On fractionation to recover the unchanged acrolein and acetone 20 cc. of condensed material was recovered. The condensed material was at first fluid and reactive toward maleic anhydride indicating a dienic butane had been formed. No fractionation of the methyl n-butadiene ketone could be completed because the material rapidly changed to a brown resinous polymer on heating.

Having described the invention in a manner such that it may be understood by those skilled in the art and having demonstrated the same by suitable examples, what is claimed is:

1. A process for the preparation of an unsaturated compound of increased molecular weight selected from the group consisting of aldehydes and ketones which comprises reacting a member of the group consisting of aldehydes, ketones and mixtures thereof in the vapor phase in the presence of hydrogen in the presence of a catalyst consisting substantially of zinc oxide and 1 to 15% by weight of zirconium oxide based on the total weight of the catalyst mixture and recovering an unsaturated compound of increased molecular weight from the reaction.

2. A process for the preparation of unsaturated ketones of increased molecular weight which comprises passing at least two molecules of ketone in the vapor phase in the presence of hydrogen over a catalyst consisting substantially of zinc oxide and 1 to 15% by weight of zirconium oxide, based on the total weight of the mixture, and recovering the unsaturated ketone of increased molecular weight from the reaction mixture.

3. A process for the preparation of unsaturated aldehyde of increased molecular weight which comprises passing at least two molecules of aldehyde in the vapor phase in the presence of hydrogen over a catalyst consisting substantially of zinc oxide and 1 to 15% by weight of zirconium oxide, based on the total weight of the mixture, and recovering the unsaturated aldehyde of increased molecular weight from the reaction mixture.

4. A process for the reaction of a ketone with an aldehyde which comprises passing a mixture containing at least one mol of aldehyde and one mol of ketone in the vapor phase in the presence of hydrogen over a catalyst consisting substantially of zinc oxide and 1 to 15% by weight of zirconium oxide, based on the total weight of the mixture, and recovering unsaturated ketone from the reaction mixture.

5. A process for the preparation of an unsaturated octyl ketone which comprises passing two mols of methyl ethyl ketone in the vapor phase in the presence of hydrogen, over a catalyst consisting substantially of zinc oxide and 1 to 15 per cent by weight zirconium oxide under conversion conditions of temperature and pressure, and recovering unsaturated octyl ketone from the reaction mixture.

6. A process according to claim 5 in which the catalyst consists substantially of 94 per cent by weight of zinc oxide and 6 per cent by weight of zirconium oxide deposited on steel turnings.

7. A process for the preparation of propylidene acetone which comprises passing at least one mol of acetone and one mol of propionaldehyde over a catalyst consisting substantially of zinc oxide and 1 to 15 per cent by weight of zirconium oxide, and recovering propylidene acetone from the reaction mixture.

8. A process according to claim 7 in which the catalyst consists substantially of 94 per cent by weight of zinc oxide and 6 per cent by weight of zirconium oxide deposited on steel turnings.

9. A process for the preparation of phorone and isophorone which comprises passing at least one mol of acetone and one mol of mesityl oxide in the vapor phase in the presence of hydrogen over a catalyst consisting substantially of zinc oxide and 1 to 15 per cent by weight of zirconium oxide, and recovering phorone and isophorone from the reaction mixture.

10. A process according to claim 9 in which the catalyst consists substantially of 94 per cent by weight of zinc oxide and 6 per cent by weight of zirconium oxide deposited on steel turnings.

HENRY O. MOTTERN.

REFERENCES CITED

The following references are of record in the file of this patent:

UNITED STATES PATENTS

| Number | Name | Date |
|---|---|---|
| 2,064,254 | Fuchs | Dec. 15, 1936 |
| 2,246,037 | Gallagher et al. | June 17, 1941 |
| 2,419,142 | Ipatieff et al. | Apr. 15, 1947 |
| 2,451,350 | Mottern et al. | Oct. 12, 1948 |
| 2,451,351 | Mottern et al. | Oct. 12, 1948 |

FOREIGN PATENTS

| Number | Country | Date |
|---|---|---|
| 400,384 | Great Britain | Oct. 26, 1933 |